UNITED STATES PATENT OFFICE.

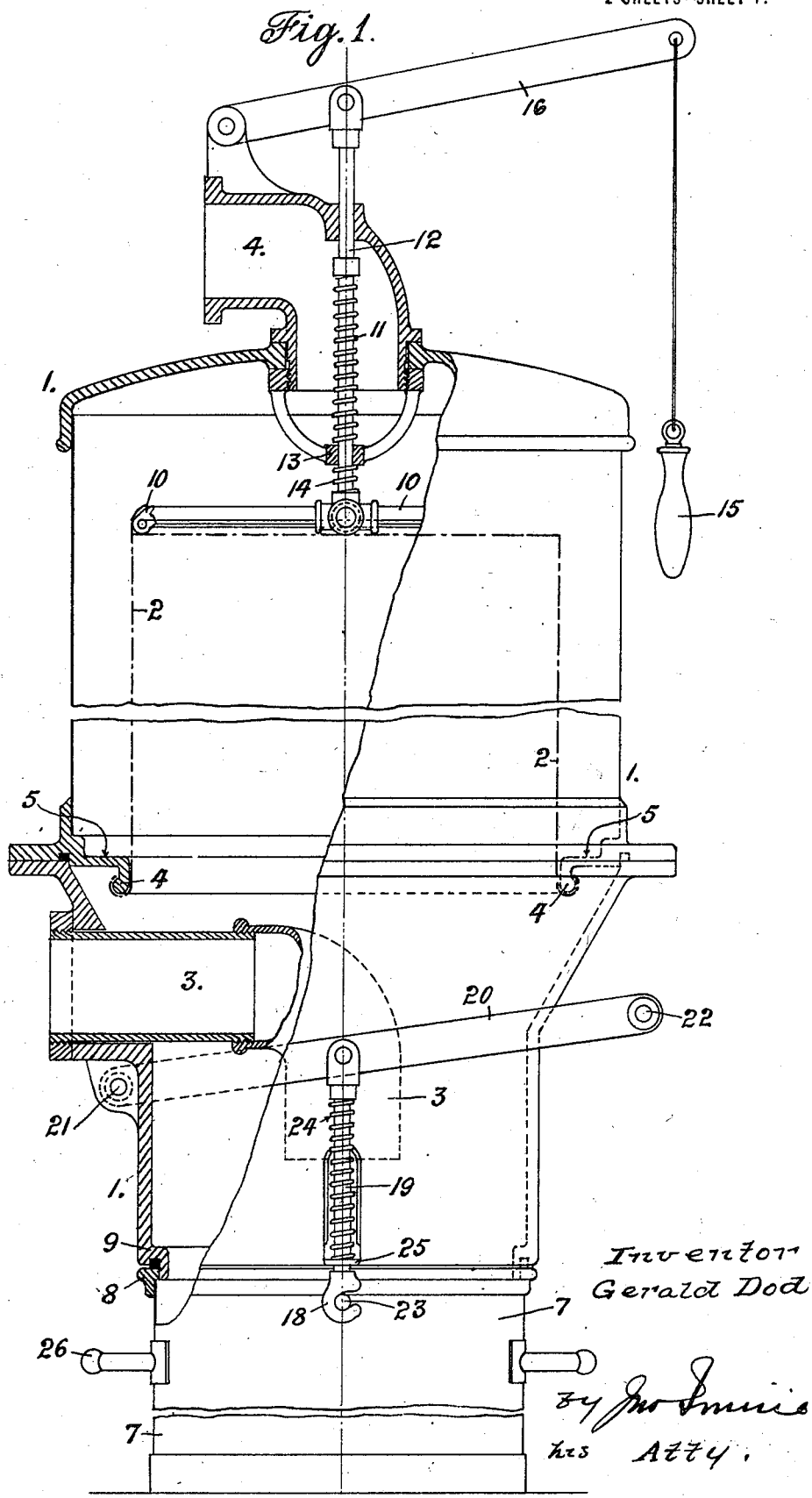

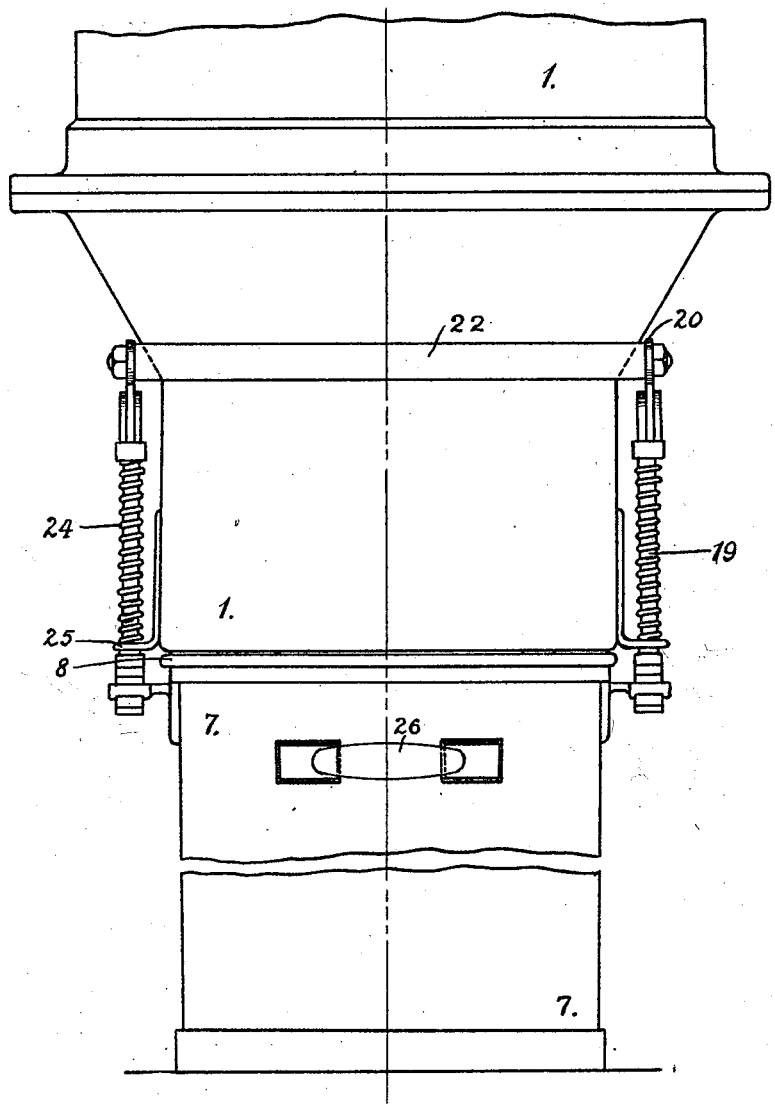

GERALD DOD, OF SOUTHPORT, ENGLAND.

APPARATUS FOR SEPARATING DUST OR LIKE MATTER FROM AIR OR GASES AND COLLECTING SAME.

1,295,711.      Specification of Letters Patent.      Patented Feb. 25, 1919.

Application filed June 17, 1916. Serial No. 104,347.

*To all whom it may concern:*

Be it known that I, GERALD DOD, a subject of the King of England, and resident of Southport, in the county of Lancaster, England, have invented new and useful Apparatus for Separating Dust or like Matter from Air or Gases and Collecting Same, of which the following is a specification.

This invention has reference to apparatus for separating dust or like light matter from air or gases, and for removing the separated substances; and it relates more particularly to that type where the main separation is effected within a lower removable vessel or bin into which the air or gas carrying the dust or like matter is delivered, and the separated matter is collected in this vessel; and the air or gas is afterward passed through a filter, consisting of textile or like material, and the residual dust removed from it; such filter being contained within a chamber or vessel above a lower vessel, open below, in connection with which the removable vessel or bin below is used and works. The air may be moved by creating a partial vacuum within the apparatus, or, conversely, by forcing, under plus pressure, the air and its contained matters into the apparatus.

Apparatus of the above character of various kinds, are known and used, and the object of the present invention is to provide improvements in apparatus of the kind referred to, by which the object is advantageously effected, and the dust or separated matter can be more readily removed and the apparatus as a whole more conveniently and effectively manipulated; together with a prevention of the disturbance of the dust after collection.

In apparatus according to this invention the dust or dirt laden air or gas is discharged downward into the center of the dust or dirt collecting bin, which is readily separable from and applicable to the other stationary portion of the apparatus, into which the said air is passed, and above which is the stationary filter chamber, so that the air ridden of the bulk of dust or dirt, rises annularly up in the bin, and then passes to the filter; and the bin is normally pressed up to the lower mouth of the stationary chamber in connection with which it works or is used, by springs, and is pressed down away from same by a manually operated means on said stationary chamber; the engaging and disengaging parts between the chamber and the bin consisting of hooks and pins or the like, in which the filter is disposed; and this part is preferably the bottom of the apparatus, which may be in the form of hopper or other shaped mouth.

In the drawing accompanying the specification there is shown an arrangement of parts of the apparatus, and mode of effecting the object of the invention in which Figure 1 is an elevation partly in section, and Fig. 2 is a view showing the lower parts of the apparatus seen at 90 degrees from that shown in Fig. 1.

Referring now to the drawings, 1 represents the vessel into which the dust laden air is introduced, and in which it is separated; and 2 is the filter within this vessel 1, through which the air passes, and by which the dust in it is separated and collected. 3 is the dust-laden-air inlet; and 4 is the discharge air outlet. The filter 2 is in the form of a bag, of textile or other suitable material, and its open end below is passed over and around a neck, on an annular diaphragm 5, within the body 1, and between the inlet 3 and the outlet 4; and it is suitably wound onto this neck.

The bin or tub in which the dust is to be collected, and which is separable from the vessel 1, is marked 7, and lies directly beneath the lower portion of the body 1—with which it makes joint, and the open end of the inlet conduit 3.

The lower open end of the air inlet conduit 3, is, as shown directly above the open top of the collecting bin or tub 7, and it discharges downward into the bin or tub.

In this downward throw of the dust laden air into the bin 7; the dust separates out to a large extent within the bin; and the air ridden of this dust, and containing the residual quantity only, passes up into and through the filter 2, in passing through which, the residue of dust is separated.

The upper end of the filter 2, which is in the form of a bag, is supported above by a carrier or frame 10, which is supported and held to by a spring 11, fitting over a rod 12, on the center of the frame 10, and passing through a guide 13, below, and the upper part of the wall of the air outlet 4. The upper end of the spring bears on a collar or shoulder on the rod 12, and so normally presses this rod and the frame 10, upward.

A buffer spring 14 is provided on the rod 12, between the guide and the frame.

The filter bag 2 is fastened in any known suitable way to the carrier 10; and it is adapted to be moved up and down by the frame, which is actuated through a handle 15, connected by a cord with a lever 16, to which the upper end of the rod 12 is connected. When the handle 15, is pulled down and let go, the frame 16 will be moved down and up; and this action shakes dust which may be adhering to the inside of the filter 2 off it, and it falls into the bin or tub 7 below. The filter therefore, is in this way, kept open and clean.

The lower spring 14 acts as a sort of buffer to the upward movement of the frame 10, which is effected by the springs 11.

The bin or tub 7, which say is of cylindrical form, is adapted to be held on and make an air tight joint between its upper edge or mouth 8, and the lower face 9 of the bottom portion or hopper of the casing 1; and it is normally pressed on to same by hooks or the like. In the construction shown, these hooks 18 are fixed on spindles 19 connected to a lever 20 hinged at 21, which are adapted to be moved down by hand, by a handle 22, connecting the two levers together. The hooks 18 engage with pins 23 on the bin 7, and are normally pressed upward by the springs 24, which are supported below by the brackets 25, the springs being sufficiently strong to hold an empty bin up to the hopper face 9. When the handle 22 is moved downward, the tub or bin will move down say on to the ground or other surface, from which it is spaced a small distance when connected up with the apparatus; and if the apparatus is worked under a vacuum, this vacuum may be sufficient to hold the bin up.

When the bin or bucket is lowered, the pins or studs 23 on the sides of it can move out of the jaws or catches 18; and the bin or bucket being clear of the upper portion of the apparatus, it may be slid or carried away by means of handles 26 and discharged; and another bin or bucket can be brought and put in position and engaged by the hooks 18, by pulling down the lever and effecting the engagement; and then upon the empty bucket or bin being lifted into position by the springs 24, it makes joint with the setting 9 of the lower hopper portion of the apparatus, and the vacuum will hold it in this position.

By this apparatus the dust is very readily collected, and when collected in the bin or bucket, is easily removed from the apparatus, and disposed of, and without disturbing the deposited dust or matter.

What is claimed is:—

1. In combination, a separable depositing bin, a chamber above said bin, operating lever means on said chamber, upwardly spring pressed engaging hook devices connected with said lever means, and a part on the upper part of the bin adapted to be engaged by said engaging devices; substantially as set forth.

2. In combination, a separable depositing bin, a chamber, a hand operated lever mounted on the chamber, upwardly engaging hook suspended from said lever, a spring supported by the chamber, and pressing the hook upward, and a part on the upper part of the bin adapted to be engaged by said engaging hooks, and normally pressing the bin upper edge onto the chamber bottom; substantially as set forth.

In testimony whereof I have signed my name to this specification in the presence of two subscribing witnesses.

GERALD DOD.

Witnesses:
SOMERVILLE GOODALL,
FRED OSBORNE.